United States Patent Office.

FRANÇOIS LOUIS DE GERBETH, OF 11 REGENT'S ROW, DALSTON, ENGLAND, ASSIGNOR TO THOMAS S. G. KIRKPATRICK.

Letters Patent No. 81,071, dated August 18, 1868; patented in England, November 11, 1867.

IMPROVEMENT IN THE MANUFACTURE OF COMPOUND OILS.

The Schedule referred to in these Letters Patent and making part of the same.

TO ALL TO WHOM IT MAY CONCERN:

Be it known that I, FRANÇOIS LOUIS DE GERBETH, of 11 Regent's Row, Dalston, in the county of Middlesex, England, have invented or discovered new and useful "Improvements in Treating Oils and Spirits, and in Apparatus to be Used for this Purpose;" and I, the said FRANÇOIS LOUIS DE GERBETH, do hereby declare the nature of the said invention, and in what manner the same is to be performed, to be particularly described and ascertained in and by the following statement thereof; that is to say—

This invention relates to converting oils which at present are not applicable to painting, varnish-making, or oil-cloth making, or other similar purposes, into oils applicable to such purposes.

The process is as follows: Petroleum or coal-oil, or similar hydrocarbon-oil, of a specific gravity of, say, from .860 to .890, and rosin-oil of specific gravity .960 to .990, are mixed, (either before or after the treatment hereinafter described,) and by preference in such proportions as will make the mixed oil of the specific gravity of from .925 to .932, or thereabouts, that is to say, of about the specific gravity of linseed-oil. Other substances, such as dead-oil, may be added to the mixture where high quality is not required. The oils, either separate or mixed together, are introduced into convenient vessels containing water, in proportion of twenty-five gallons to forty gallons per ton of oil, and heated, by preference by means of steam blown through them, to a temperature of from 150° to 212° Fahrenheit, and the following chemical substances are then added, namely, chloride of lime or hypochlorite of lime, black peroxide of manganese, and chlorate of potash. The chloride of lime or hypochlorite of lime is employed in the proportion of thirty-five pounds to the ton of oil; the black oxide of manganese in the proportion of twenty pounds to the ton of oil; and the chlorate of potash in the proportion of one pound to the ton of oil. In place of these reagents, other oxidizers may be employed, such as other chlorides or hypochlorites of other alkaline earths, protoxide of manganese, manganate or permanganate of potash, or soda, chlorate of soda, or else peroxide of barium, two pounds to five pounds, and red chromate of potash, ten pounds, and sulphuric acid "of commerce," twenty to twenty-five pounds per ton of oil.

The whole is then agitated by blowing in free steam. After about half an hour, chlorite of potash is again added in the same proportions as before, the agitation with steam is continued for another hour, and then driers are added. I prefer to use sulphate of zinc, acetate of lead, and protoxide of lead, in the proportions of fourteen to twenty-one pounds of the zinc salt, ten to twenty pounds of the acetate, and from three to seven pounds of litharge to the ton of oil. The agitation by steam is continued for another hour, and when discontinued, a current of atmospheric air or ozonized atmospheric air (by preference the latter) is forced into and through the oil, for two hours or more, or until the oil is sufficiently free from smell. The ozonized air is advantageously obtained by causing a current of air from a suitable forcing-apparatus to pass between glass plates covered on each side with tin-foil. I arrange eighteen such plates, each three feet long and two feet wide, in a wooden case, parallel, the one to the other, and about one inch apart. Every alternate plate is connected with the positive pole of a galvanic battery, and the other or intermediate plates are connected with the negative pole. The air is compelled to pass between the plates in succession from end to end of the series, and is then blown through the oil.

The battery I employ consists of ten cells, each containing plates, five inches long and three inches broad, of zinc and platinized silver, and the battery is excited by sulphuric acid, diluted with seven times its bulk of water.

During the treatment with air, the oil is being subjected to the action of galvanic electricity, by means of another battery, such as that above described, the conducting-wires from which are dipped into the vessel containing the oil. The oil is then allowed to settle in a warm place, or is kept warm by means of steam led through it in a close coil, so as not to agitate the oil. When the oil becomes clear and bright, it is ready for use.

Filtering through freshly-burnt animal charcoal will facilitate the process of clearing and fining.

In order to do away with the objectionable dark color usually existing in petroleum or other hydrocarbon-oil, such oils may be treated separately, by heating them, by preference, by steam, and adding chloride of lime, black oxide of manganese, chlorate-of-potash water, in the proportions hereinbefore mentioned, or the alternatives above named. At the same time as the oils are treated as above, they are also submitted to the action of a galvanic battery, as is also hereinbefore described, and after they have become settled and cleared, they may be distilled in such manner as is usually adopted in the distillation of such substances.

In order to produce a substance applicable to the purposes for which turpentine is employed, white-rosin spirit, of a specific gravity of, say, .830 to .860, is mixed with light spirits or oils distilled from petroleum, (or other similar light hydrocarbon-spirit or oil,) of a specific gravity of, say, .780 to .820. These spirits or oils are submitted to a process similar to the above, but on account of the volatility of the materials used, the heating by steam is dispensed with, mere agitation in presence of the above chemicals being sufficient. The mixture should be made in preference in such proportions as to yield a product of the specific gravity of from .820 to .825, or thereabouts, that is to say, of about the specific gravity of turpentine.

After the process has been carried on for one or more hours, the oil or spirit is allowed to settle, and is then redistilled, tar-spirit, or vegetable-tar spirit, or brown-rosin spirit may be added, but in such cases the distillation will have to be repeated.

What I claim, is—

The production of an oil resembling linseed-oil, and applicable to painting and varnish-making, from a mixture of petroleum or coal-oil, or such like hydrocarbon and rosin-oil, such oils being treated with oxidizing-agents, ozonized air, galvanic electricity, and driers, as herein described.

I also claim the treating petroleum, coal-oil, or other similar hydrocarbon-oil with oxidizing-agents, and galvanic electricity, so as to improve the color, as herein described.

I also claim the production of a spirit similar to turpentine, from a mixture of light petroleum or coal-oil, or other similar light hydrocarbon-oil or spirit, and light rosin-oil or spirit, such oils or spirits being treated with oxidizing-agents, ozonized air, and galvanic electricity, as herein described.

I also claim the apparatus hereinbefore described, for the treatment of oils and spirits by means of ozonized air.

FRANÇOIS LOUIS DE GERBETH.

Witnesses:
G. F. WARREN,
THOS. BROWN,
} Both of No. 17 Gracechurch Street, London.